United States Patent [19]

Itaya et al.

[11] Patent Number: 4,498,739

[45] Date of Patent: Feb. 12, 1985

[54] ELECTROCHROMIC DISPLAY DEVICES USING IRON(III) HEXACYANOFERRATE(II) SALT

[75] Inventors: Kingo Itaya, Tagajo; Kimio Shibayama; Shinobu Toshima, both of Sendai; Tatsuaki Ataka; Koji Iwasa, both of Tokyo, all of Japan

[73] Assignee: Seiko Instruments & Electronics Ltd., Tokyo, Japan

[21] Appl. No.: 381,800

[22] Filed: May 25, 1982

[30] Foreign Application Priority Data

May 26, 1981 [JP] Japan .................................. 56-79911
Oct. 2, 1981 [JP] Japan ................................ 56-156971
Dec. 7, 1981 [JP] Japan ................................ 56-196623

[51] Int. Cl.³ .................... G02F 1/01; C25D 11/00; C25B 11/04
[52] U.S. Cl. ................................ 350/357; 204/56 R; 204/290 R; 204/292
[58] Field of Search .................. 350/357; 340/705; 204/112, 56 R, 290 R, 292

[56] References Cited

FOREIGN PATENT DOCUMENTS 2441895 11/1979 France ............................... 350/357

OTHER PUBLICATIONS

Vernon D. Neff, J. Electrochem. Soc.: Electrochemical Science & Technology, 125, No. 6, 886–887 (1978).

Primary Examiner—Bruce Y. Arnold
Assistant Examiner—William Propp
Attorney, Agent, or Firm—Robert E. Burns; Emmanuel J. Lobato; Bruce L. Adams

[57] ABSTRACT

An electrochromic display device comprises an electrolyte contained between a pair of spaced-apart substrates. A set of electrodes are disposed on at least one of the substrates in contact with the electrolyte and a layer of electrochromic material is disposed on at least one of the electrodes to define a display electrode. The electrochromic material comprises a color-reversible salt of iron(III) hexacyanoferrate(II) which, depending on its oxidation-reduction state, exhibits different colors. A source of electric charge is connected through circuitry to effect reversible electrochemical oxidation and reduction of the salt of iron(III) hexacyanoferrate(II) to effect a corresponding reversible color change exhibited by the display electrode.

28 Claims, 17 Drawing Figures

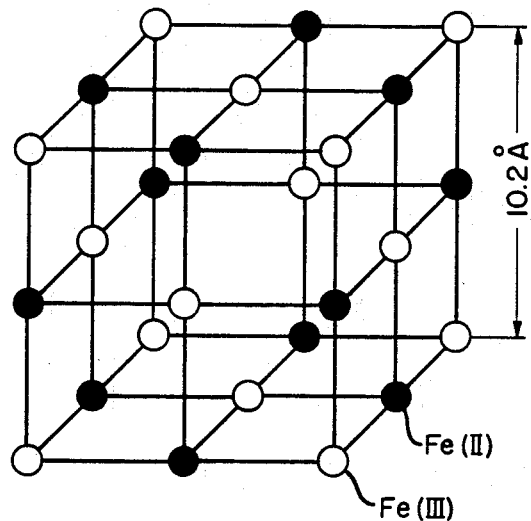
FIG. 1-(a)
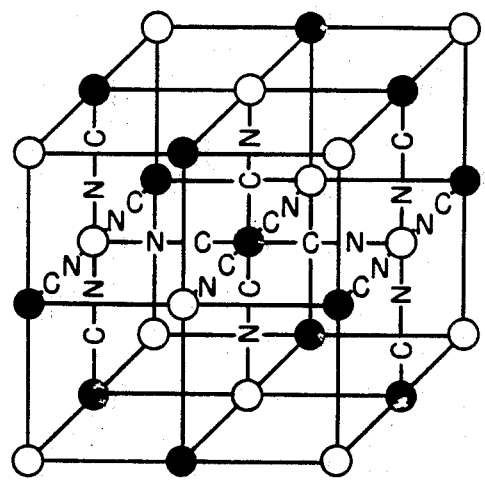
FIG. 1-(b)

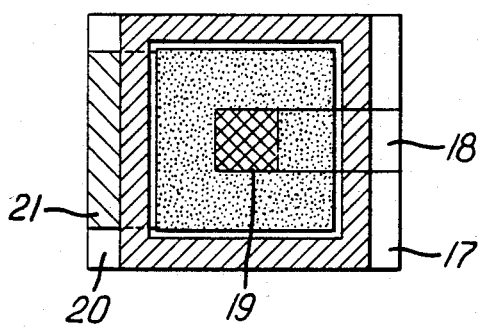
FIG. 11-(a)
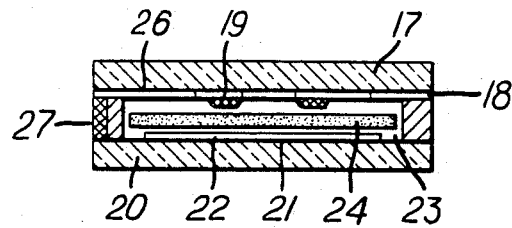
FIG. 12-(a)
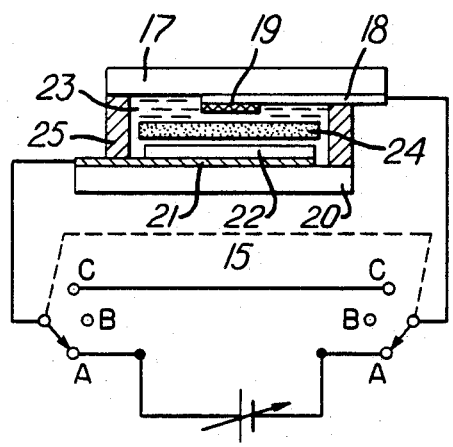
FIG. 11-(b)
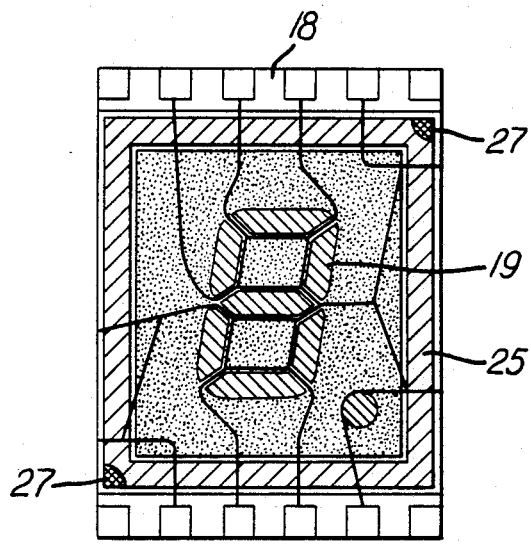
FIG. 12-(b)
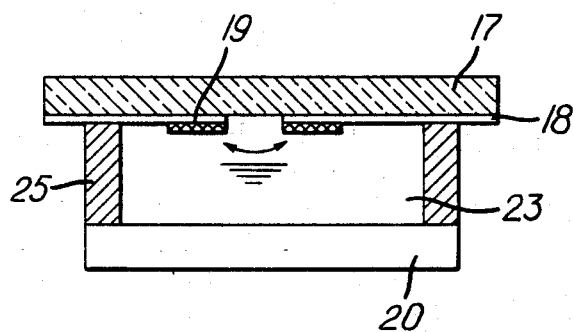
FIG. 13
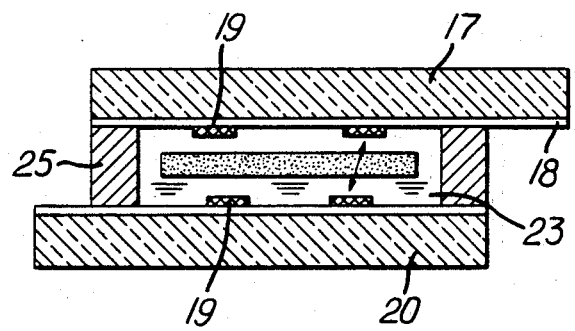
FIG. 14

ELECTROCHROMIC DISPLAY DEVICES USING IRON(III) HEXACYANOFERRATE(II) SALT

BACKGROUND OF THE INVENTION

This invention relates generally to electrochromic display devices utilizing the reversible color change of an electrochromic material due to electrochemical oxidation-reduction reaction, and more particularly, to electrochromic display devices wherein the electrochromic material comprises iron(III) hexacyanoferrate(II) salt.

With the advances being made in electronics technology, there is an increasing demand for display devices for use with portable information processing instruments, such as watches and electronic calculators. Conventional display devices used for these purposes usually include liquid crystal display devices. Although liquid crystal display devices have the advantages of fairly acceptable response speed and a somewhat reliable lifetime, they have the serious disadvantages of exhibiting dark display and reduced visibility when viewed at an angle (visual dependence). Liquid crystal devices also have visual and aesthetic limitations which restrict their use in some types of display devices. To provide a new display device which is free of the shortcomings of liquid crystal display devices, considerable research and development have been carried out involving electrochromic display devices utilizing the phenomenon of reversible color change which occurs in particular materials through electrochemical oxidation and reduction. Typical examples of such electrochemically color-developing materials (which are referred to hereinafter as "electrochromic materials") used in the prior art are viologen, which is composed of alkyl quaternary ammonium derivatives of $\gamma,\gamma'$-dipyridyl, and transition metal oxides, as exemplified by tungsten trioxide. The electrochromic material is applied as a layer or film onto the surface of an electrode to form what is commonly known in the art as a "display element" or "display electrode" and for convenience of description, the term "display electrode" is primarily used in the following description of the invention.

The present invention is discriminated from the prior art techniques in that it provides an electrochromic display device using a salt of iron(III) hexacyanoferrate(II) which has not heretofore been used as an electrochromic material.

In the case of viologen, which is a typical example of a conventional electrochromic material, when an electrolyte solution having viologen dissolved therein is subjected to electrolytic reduction, a viologen radical is formed as a colored deposit on the cathode surface according to the reaction of equation (1):

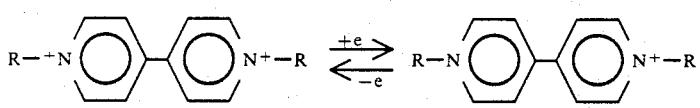

wherein R is an alkyl group. Such systems, which involve a reaction resulting in the deposit of a coloring species from an electrolyte solution onto the electrode surface, have the following disadvantages: the quantity of charge must be precisely controlled per unit area of the electrode to provide a uniform tone, because the display color depends on the quantity of the deposit formed on the electrode surface, and they tend to deteriorate after repeated oxidation-reduction cycles, as the viologen itself lacks chemical stability.

Another conventional system using tungsten oxide, one of the transition metal oxides, as an electrochromic material, utilizes color development by tungsten bronze. The tungsten bronze is produced through a reaction caused by the simultaneous introduction of electrons from the electrode, and metal ions from the electrolyte solution, into the layer of tungsten oxide on the electrode surface, according to equation (2):

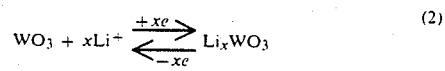

In order that the reaction of equation (2) be electrochemically reversible, x should be equal to or less than 0.3 ($x \leq 0.3$) in equation (2). If x is more than 0.3 ($x > 0.3$), the reaction becomes irreversible and thus incompatible with the display purpose. Display devices involving a non-stoichiometric reaction, such as required to effect the reversible production of tungsten bronze, are difficult to drive because the electrolysis must always be controlled so that x does not exceed the reversible range, and thus these prior art display device are not suitable for all commercial applications.

SUMMARY OF THE INVENTION

An object of the present invention is to provide a new electrochromic display which overcomes the aforementioned problems of prior art display devices.

A further object of the present invention is to provide a stable electrochromic display device which utilizes a stoichiometric electrochemical reaction.

Another object of the present invention is to provide a new display element or display electrode composed of a new type of electrochromic material.

Still another object of the present invention is to provide a new process for producing display electrodes for use in electrochromic display devices.

These and other objects of the invention are achieved by a display device comprised of a display electrode having an iron(III) hexacyanoferrate(II) salt as the electrochromic reactive material.

A unique method of preparing a thin film of iron(III) hexacyanoferrate(II) salt has been discovered whereby control of the optical density is readily achieved. Moreover, a relatively simple display device can be obtained by using iron(III) hexacyanoferrate(II) salt as the electroactive material for both the display and counter electrodes.

BRIEF DESCRIPTION OF THE DRAWINGS

FIG. 1-($a$) is an explanatory diagram of the crystal lattice of insoluble Prussian blue, and FIG. 1-($b$) is an explanatory diagram of the crystal lattice of soluble Prussian blue. In the figure, the symbol ● designates $Fe^{II}$, ○ designates $Fe^{III}$, and in FIG. 1-($b$), the C and N atoms of some of the cyano groups are shown bonding with $Fe^{II}$ and $Fe^{III}$, respectively. The water molecules in the crystal are omitted for clarity of illustration as are all of the cyano groups in FIG. 1-(a) and some of the cyano groups in FIG. 1-(b).

FIG. 11-(a) is a plan view and FIG. 11-(b) is a cross-sectional view of one embodiment of display device constructed in a flat form.

FIG. 12-(a) is a plan view and FIG. 12-(b) is a cross-sectional view of an embodiment of electrochromic numerical display device according to the present invention.

FIG. 13 is a sectional view of another embodiment of electrochromic display device according to the present invention.

FIG. 14 is a sectional view of a further embodiment of electrochromic display device according to the present invention.

DETAILED DESCRIPTION OF THE INVENTION

Figure 2:
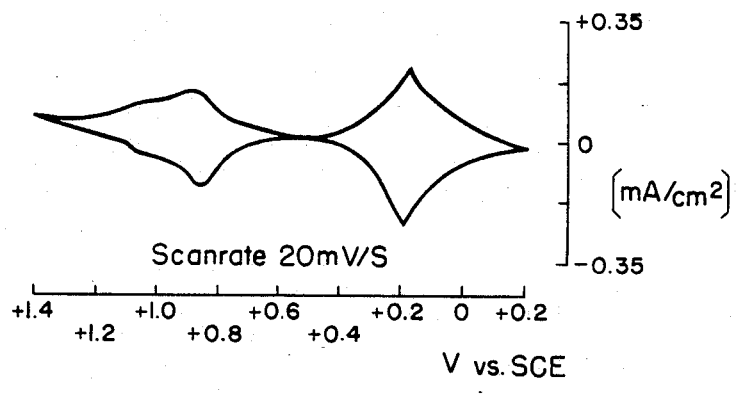
FIG. 2 is a cyclic voltammogram obtained when an SnO$_2$ electrode coated with about 2.5 mC./cm.$^2$ of an iron(III) hexacyanoferrate(II) salt according to the present invention is driven in 1M KCl.

According to the present invention a salt of iron(III) hexacyanoferrate(II) has been found to be an improved, novel electrochromic material which is free of many of the disadvantages of the conventional electrochromic materials. In general, the iron(III) hexacyanoferrate(II) salt is included in a group of blue pigment compounds known as Prussian blue. At present, the group of compounds called Prussian blue are generally classified into two groups of compounds: insoluble Prussian blue and soluble Prussian blue of formulas (4) and (5), respectively.

$Fe^{III}_4[Fe^{II}(CN)_6]_3$ insoluble Prussian blue (4)

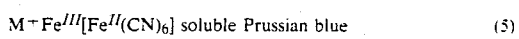
$M^+Fe^{III}[Fe^{II}(CN)_6]$ soluble Prussian blue (5)

wherein M$^+$ is a monovalent cation such as Li$^+$, Na$^+$, K$^+$, Rb$^+$, Cs$^+$, NH$_4^+$, etc.

FIG. 1-(a) and FIG. 1-(b), show the crystalline structures of insoluble Prussian blue and soluble Prussian blue, respectively. As is apparent from FIG. 1, both insoluble Prussian blue and soluble Prussian blue are mixed valence complexes having a three-dimensional network structure in which a cyano group links Fe$^{II}$ and Fe$^{III}$. The C atom of the cyano group coordinates with Fe$^{II}$ and the N atom of the cyano group coordinates with Fe$^{III}$. Iron atoms of different oxidation numbers, that is, Fe$^{III}$ and Fe$^{II}$ coexist in a common compound, and for this reason, the compound is called a mixed valence complex. The aesthetic blue color inherent to Prussian blue is attributable to the mixed valence absorption band due to the coexistence of iron atoms of different oxidation numbers in the single compound as described above. If all the Fe$^{III}$ atoms in the crystal are reduced to Fe$^{II}$, the crystal loses its blue color and becomes colorless, while the crystalline structure itself remains unchanged.

The present invention is based on the discovery that the valence of Fe$^{III}$ in the above-mentioned mixed valence complex may be reversibly changed between trivalence and divalence by an electrochemical oxidation-reduction with a concomitant change in color in an electrochromic display device. This oxidation reduction reaction may be represented by equation (6) or (6'):

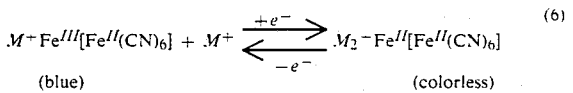
$$M^+Fe^{III}[Fe^{II}(CN)_6] + M^+ \underset{-e^-}{\overset{+e^-}{\rightleftarrows}} M_2^+Fe^{II}[Fe^{II}(CN)_6] \quad (6)$$
(blue) (colorless)

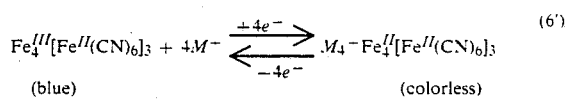
$$Fe^{III}_4[Fe^{II}(CN)_6]_3 + 4M^+ \underset{-4e^-}{\overset{+4e^-}{\rightleftarrows}} M_4^+Fe^{II}_4[Fe^{II}(CN)_6]_3 \quad (6')$$
(blue) (colorless)

wherein M$^+$ represents a monovalent cation such as Li$^+$, Na$^+$, K$^+$, Rb$^+$, Cs$^+$, NH$_4^+$, etc.

Unlike the earlier-mentioned viologen system which depends on the cyclic deposition and dissolution of a coloring species from and into solution, an electrochromic display element having an iron(III) hexacyanoferrate(II) salt incorporated as an electrochromic material utilizes the color change which occurs as a result of an electrochemical reaction of the iron(III) hexacyanoferrate(II) salt, which is present on the surface of the display electrode as a contiguous, uniform thin film of an insoluble mixed valence complex having a three-dimensional network structure. Consequently, the color is always developed at a given color density depending on the thickness of the iron(III) hexacyanoferrate(II) salt layer. Furthermore, as shown by equations (6) and (6'), the reaction is not a non-stoichiometric reaction as in the case of reaction of tungsten oxide according to equation (2), but rather a stoichiometric one or four-electron transfer reaction. The display element of the invention is easy to drive because the quantity of the charge does not need to be precisely controlled.

There is no chemical stability problem with respect to the blue pigment known as Prussian blue as shown by its long, established use in a wide variety of applications, for example, in paint and printing ink, since its discovery in 1704. The electrochromic display element of the invention, comprised of iron(III). hexacyanoferrate(II) salt is easy to drive to develop an aesthetic Prussian blue color at a given density and involves a particular coloring species having well established chemical stability proved by long usage.

The iron(III) hexacyanoferrate(II) salt used as the electrochromic material in the present invention preferably corresponds to the compound traditionally called insoluble Prussian blue and having the chemical formula: $Fe_4[Fe(CN)_6]_3 \cdot nH_2O$ wherein n is equal to 12 to 14. As mentioned above, the compound called Prussian blue is generally classified into two compounds—namely, insoluble Prussian blue and soluble Prussian blue. Each of these compounds is derived by particular respective processes.

Insoluble Prussian blue may be synthesized by mixing an aqueous solution containing hexacyanoferrate(II) ions with an excess of a solution containing iron(III) ions and causing insoluble Prussian blue to precipitate from the resulting mixture.

On the other hand, soluble Prussian blue may be synthesized by mixing equal molar amounts of an aqueous solution of hexacyanoferrate(II) ions and a solution of iron(III) ions and causing soluble Prussian blue to precipitate from the resulting mixture.

Unlike the two known processes, a unique process has been discovered for synthesizing the display element of the invention in which iron(III) hexacyanoferrate(II) salt is electrochemically synthesized or electrodeposited directly on the surface of a display electrode as an intimately adhering, contiguous, uniform film. This inventive process provides a display electrode capable of electrochemical reversible color change.

Preferably, the electrochromic display device of the invention is prepared by electrodepositing iron(III) hexacyanoferrate(II) salt on a substrate as a thin uniform film from a solution containing iron(III)ions and hexacyanoferrate(III) ions, for example, from a solution of potassium hexacyanoferrate(III) and ferric chloride. An aqueous acid solution containing approximately equal amounts of hexacyanoferrate(III) ion and iron-(III) ion is partilarly preferred. The resulting deposit is a solid, adhering film of the formula, $Fe^{III}_4[Fe^{II}(CN)_6]_3$, of insoluble Prussian blue. As a result of determinations described below, the composition resulting from electrodeposition according to the invention has been found to have a composition in the ground state which more precisely corresponds to the formula:

$$M_l^- Fe_4^{III}[Fe^{II}(CN)_6]_3 \cdot \frac{m}{l} X^{l-} \cdot nH_2O$$

in the reduced state the composition corresponds to the formula:

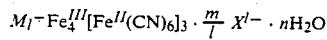

and in the oxidized state to the formula:

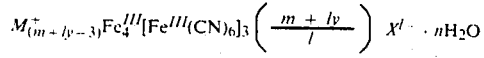

wherein:
   $M^+$ is a monovalent cation,
   $X^{l-}$ is an l-valent anion,
   l is 1 or 2,
   m is 0 or a positive integer of not more than 5,
   n is 0 or a positive integer of not more than 14,
   x and y are positive integers,
and wherein l, m, x, and y satisfy the following relationships:

$$0 \leq (l+1)m \leq 8$$

$$0 \leq (l+1)(m+4) - 4 \leq 8l$$

$$0 \leq m + x - 4$$

$$0 \leq (l+1)(m+ly) - 3l \leq 8l$$

$$0 \leq m + ly - 3$$

The electrochromic material in the display device of the invention is preferably insoluble Prussian blue.

As demonstrated by determinations which are discussed below the oxidation-reduction mechanism of insoluble Pressian blue is different from that of soluble Prussian blue.

Figure 3:
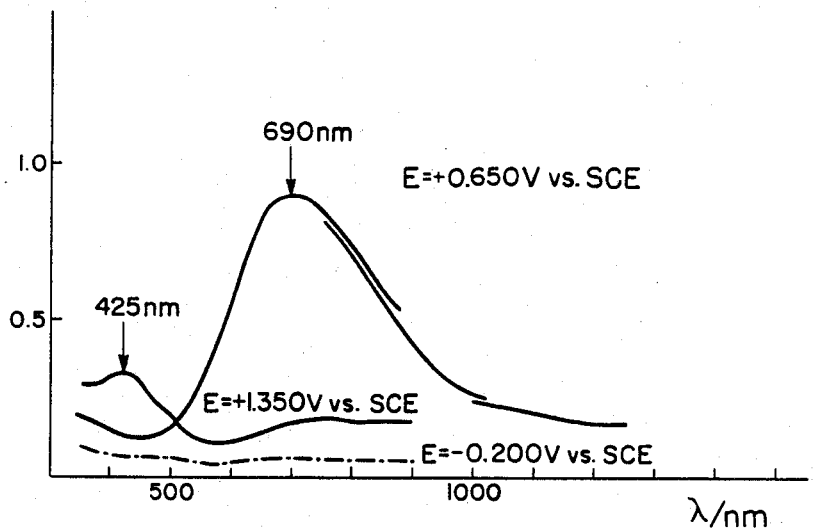
FIG. 3 shows the absorption spectra of an SnO$_2$ transparent electrode coated with about 10.5 mC./cm.$^2$ of an iron(III) hexacyanoferrate(II) salt according to the present invention when it is at 1.35 V, 0.65 V and −0.2 V vs. S.C.E., respectively.

FIG. 2 is a cyclic voltammogram of an $SnO_2$ transparent electrode coated with about 2.5 mC./cm.$^2$ of the iron(III) hexacyanoferrate(II) salt according to the present invention in 1M KCl aqueous solution. FIG. 3 shows the absorption spectra of a similar electrode which is at potentials of $+1.35$ V, $+0.65$ V and $-0.2$ V vs. S.C.E. and at a charge density of 10.5 mC./cm.$^2$. It has been found that this electrode exhibits a spectrum having an absorption peak at 690 nm and is thus colored blue when it is at a potential of $+0.6$ V vs. S.C.E. This spectrum having an absorption peak at 690 nm substantially agrees with that previously reported for colloidal Prussian blue. The electrode shows no absorption and is transparent when it is at about $-0.2$ V vs. S.C.E., and it shows a moderate absorption peak at 425 nm and is thus colored pale brown when it is at about 1.35 V vs. S.C.E.

As seen from the cyclic voltammogram of FIG. 2, waves appearing in this electrode have two peaks at about $+0.2$ V and $+0.9$ V vs. S.C.E. For each of the peaks, the electrochemical reactions involved in soluble and insoluble Prussian blue are considered below.

First, the electrochemical reactions of soluble and insoluble Prussian blues are compared with respect to the wave having a peak at about $+0.2$ V vs. S.C.E.

Reaction of soluble Prussian blue:

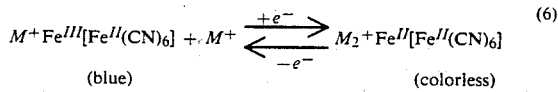
(6)

Reaction of insoluble Prussian blue:

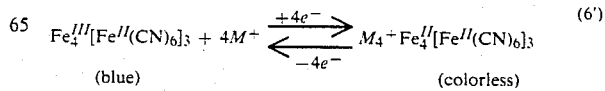
(6')

In the above equations, M+ represents a monovalent cation such as Li+, Na+, K+, R+, Cs+, NH4+, etc.

As used throughout the specification and drawings, the abbreviation S.C.E. stands for Saturated Calomel Electrode which is widely used as a reference electrode and which has a stable electric potential of +0.246 V at 25° C. with respect to the international standard hydrogen electrode.

As seen from the above equations, the soluble and insoluble Prussian blues give rise to electrochemical reactions which are common in that an electron(s) and a monovalent cation(s) are simultaneously introduced into the coating.

Next, the electrochemical reactions of soluble and insoluble Prussian blues are compared with respect to the wave having a peak at +0.9 V vs. S.C.E.

Reaction of soluble Prussian blue:

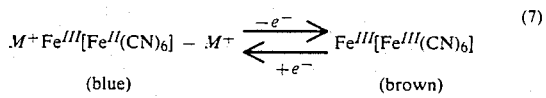
(blue)      (brown)     (7)

Reaction of insoluble Prussian blue:

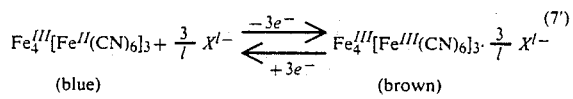
(blue)      (brown)     (7')

In the above formulas, $X^{l-}$ represents an l-valent anion.

A comparison between equations (7) and (7') reveals that the electrochemical reaction of soluble Prussian blue allows M+ cations and electrons to move in and out of the coating, whereas the electrochemical reaction of the insoluble Prussian blue allows $X^{l-}$ anions and electrons to move in and out of the coating. In summary, the soluble and insoluble Prussian blues have two significantly different features with respect to the wave having a peak at about +0.2 V and the wave having a peak at about +0.9 V vs. S.C.E. First, the wave having a peak at about +0.9 V vs. S.C.E. induces an electrochemical reaction accompanying the movement of M+ cations in the case of soluble Prussian blue, whereas the same wave induces another electrochemical reaction accompanying the movement of $X^{l-}$ anions in the case of insoluble Prussian blue. The second difference is the ratio of electrons associated with the waves having peaks at about +0.2 V and +0.9 V vs. S.C.E. The electron ratio is 1:1 for soluble Prussian blue while it is 4:3 for insoluble Prussian blue. As evident from the foregoing, it is necessary to determine whether the iron(III) hexacyanoferrate(II) used as the electrochromic material is soluble or insoluble Prussian blue to properly drive an electrochromic display element using iron(III) hexacyanoferrate(II) and therefore the associated electrochemical reaction must be fully understood.

As illustrated by the following examples, an aspect of the present invention is the establishment of proper principles for operating an iron(III) hexacyanoferrate(II) salt-coated electrode; to this end the composition of the iron(III) hexacyanoferrate(II) salt obtained by electrodeposition has been determined through atomic absorption and flame spectrochemical analyses, and a new electrochemical oxidation-reduction mechanism has been found through electrochemical measurements. While the present examples are directed specifically to principles for operating a display device having as the electrochromic material, an insoluble iron(III) hexacyanoferrate(II) salt, it is apparent that the same determinations and corresponding principles can be applied to the operation of a display device having soluble iron(III) hexacyanoferrate(II) salt as the electrochromic material.

EXAMPLE 1

This example illustrates a general process of preparing an iron(III) hexacyanoferrate(II) salt-coated electrode to be used in the present invention.

An aqueous solution containing 20 millimoles/liter of potassium hexacyanoferrate(III) (K3Fe(CN)6) and an aqueous solution containing 20 millimoles/liter of iron(III) chloride (FeCl3) and adjusted to 0.2 N with hydrochloric acid were mixed in equal volumes to form a clear brown solution.

Immersed in this clear brown solution were a platinum plate electrode having an area of 1 cm.² which was to become an iron(III) hexacyanoferrate(II) salt-coated display element or display electrode of the present invention and a platinum plate electrode having an area of about 10 cm.² for supplying current to the display electrode. Galvanostatic electrolysis was then effected for about 10 minutes by supplying a current of 10 μA to cathodically polarize the 1 cm.² platinum plate electrode. After the electrolysis was complete, the cathodically-polarized platinum plate electrode of 1 cm.² in area was removed from the clear brown solution it was found that a contiguous, uniform, blue, insoluble solid film had been deposited on the surface of the 1 cm.² platinum plate electrode.

EXAMPLE 2

In this example, the composition of the iron(III) hexacyanoferrate(II) salt was investigated.

The general procedure of Example 1 used to coat an electrode with the iron(III) hexacyanoferrate(II) salt was repeated, except that the electrode to be coated was a platinum plate having an area of 10 cm.² and galvanostatic electrolysis was effected for 10 minutes with a current of 100 μA. A blue insoluble solid film was formed on the platinum cathode electrode of 10 cm.² in area and used as a sample for analysis. The insoluble solid film was dissolved in 28% aqueous ammonia, neutralized with 1/1 hydrochloric acid/water, and diluted to 100 cc. with water to prepare a sample solution for analysis. Flame spectrochemical analysis was used to determine the amount of potassium and atomic absorption analysis was used to determine the amount of iron.

Another electrode coated with the iron(III) hexacyanoferrate(II) salt was prepared separately from the electrode used above for analysis. With this electrode placed in an aqueous solution of 1 M KCl at pH 4.0, a cyclic voltammogram was measured to determine the quantity of charge used in the oxidation-reduction reaction along the wave having a peak at about +0.2 V vs. S.C.E.

Table 1 shows the quantities of potassium and iron determined by flame spectrochemical and atomic absorption analyses in combination with the corresponding quantity of electric charge.

TABLE 1

| | | unit: ug./mC. | |
|---|---|---|---|
| | Found | Calculated for Fe4[Fe(CN)6]3 | Calculated for KFe[Fe(CN)6] |
| Fe | 1.02 | 1.01 | 1.16 |

TABLE 1-continued

| | | unit: ug./mC. | |
|---|---|---|---|
| | Found | Calculated for $Fe_4[Fe(CN)_6]_3$ | Calculated for $KFe[Fe(CN)_6]$ |
| K | 0.06 | 0 | 0.41 |

As seen from Table 1, the iron(III) hexacyanoferrate(II) salt synthesized by the particular electrolytic process used in the present invention is the so-called "insoluble Prussian blue", corresponding to the composition of the formula: $Fe_4[Fe(CN)_6]_3$.

EXAMPLE 3

This example was carried out to determine the optimum pH range for an electrolyte to be combined with the iron(III) hexacyanoferrate(II) salt-coated electrode in an electrochromic element according to the present invention.

Figure 4:
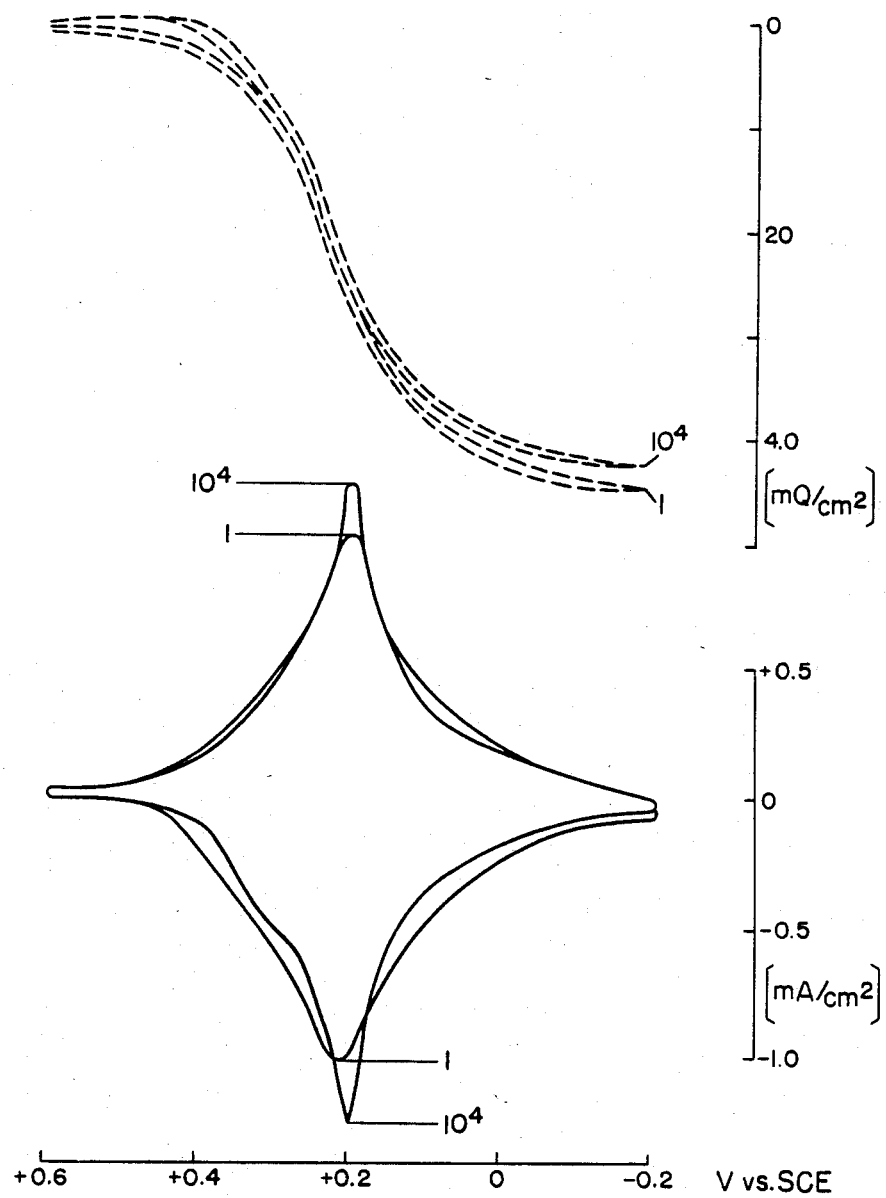
FIG. 4 is a cyclic voltammogram of the iron(III) hexacyanoferrate (II) salt-coated electrode of the present invention having a peak at about 0.2 V, and the integral value of the charge quantity required for oxidation-reduction along this wave is shown by dashed lines. In the FIG., 1 corresponds to the first cycle and 10$^4$ corresponds to the end of 10$^4$ cycles.
Figure 5:
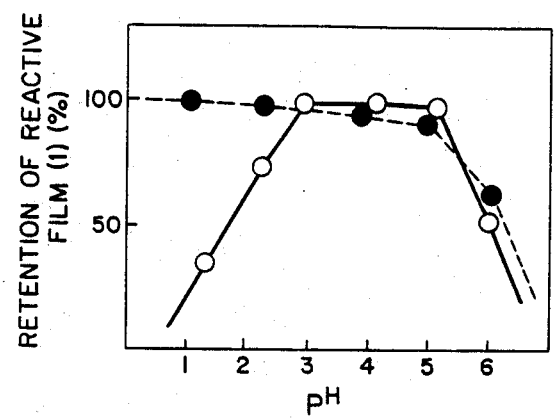
FIG. 5 shows the reactive film retention of the iron-(III) hexacyanoferrate(II) salt-coated electrode of the present invention at varying pH, in which a solid line designates the reactive film retention after 10$^5$ cycles and a dashed line designates the reactive film retention of a similar electrode after immersion for about 24 hours.

FIG. 4 is a cyclic voltammogram of the iron(III), hexacyanoferrate(II) salt-coated electrode of the present invention in 1 M KCl aqueous solution, showing waves having a peak of about 0.2 V vs. S.C.E. The quantity of charge required for the oxidation-reduction reaction at about 0.2 V vs. S.C.E. was measured by means of a coulometer and is shown by dashed lines in FIG. 4. These dashed lines show how the quantity of charge varies in successive cycles when the iron(III) hexacyanoferrate(II) salt-coated electrode is driven by applying a voltage of 1 Hz at stepped potentials between 0.6 V and −0.2 V vs. S.C.E. The variation of quantity of charge may be used as a measure of evaluating the stability of the coating film, and the retention of the reactive film is defined as follows:

Retention of the reactive film (1) = $\frac{\text{Quantity of charge required in a given cycle}}{\text{Quantity of charge required in the first cycle}} \times 100\%$ This reactive film retention was used to determine an adequate pH range of the electrolyte required when the iron(III) hexacyanoferrate(II) salt-coated electrode of the present invention was operated. In the determination, aqueous solutions of 1 M KCl were prepared and adjusted to varying pH's with hydrochloric acid, and the retention of the reactive film was determined after $10^5$ cycles for each solution. The results are shown in FIG. 5, in which a solid line shows how the reactive film retention varies with pH when the electrodes are driven and a dashed line shows how the reactive film retention varies with pH when the electrodes are immersed. As seen from FIG. 5, the iron(III) hexacyanoferrate(II) coated electrode of the present invention should be driven at optimum pH in the range between 3 and 5. The iron(III) hexacyanoferrate(II) coated electrode cannot be stably driven in an alkaline electrolyte having a pH higher than 5 due to dissolution of the coating film or an acidic electrolyte at a pH lower than 3 due to invasion of protons into the coating film.

EXAMPLE 4

This example was carried out to select the proper electrolyte cation to be combined with the iron(III) hexacyanoferrate(II) salt coated electrode in an electrochromic element according to the present invention.

Figure 6:
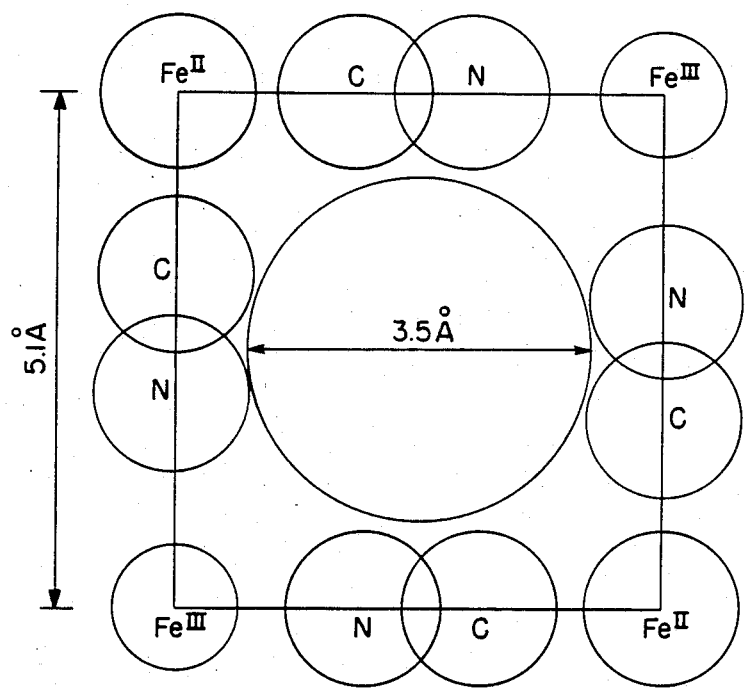
FIG. 6 shows the size of the bottle-neck of Prussian blue.

As previously mentioned, the wave having a peak at about 0.2 V vs. S.C.E. is related to the movement of cations into and out of the coating film. As shown in FIG. 1, the iron(III) hexacyanoferrate(II) salt is of a substantially open structure having a lattice constant of 10.2 Å and any cations seem to move freely into and out of such an open structure. However, when the dimensions of the atoms constituting the crystal are taken into account, the bottle-neck diameter, i.e. the maximum diameter of a particle capable of moving freely through the crystal lattice, is about 3.5 Å as shown in FIG. 6. Thus the bottle-neck diameter is a limit to the size of a cation which is capable of moving into and out of the coating film.

Figure 7:
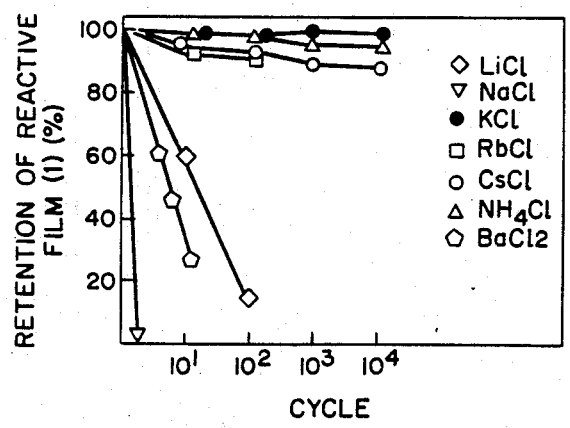
FIG. 7 shows the variation of the reactive film retention with increasing cycles for various cations.

In this example, electrolytes having different cations were used to determine acceptable cations. The iron(III) hexacyanoferrate(II) salt-coated electrode was prepared as in Example 1 and evaluated in terms of the retention of the reactive film as in Example 3. The electrolytes used were alkali metal chlorides, specifically LiCl, NaCl, KCl, RbCl, and CsCl; an alkaline earth metal chloride, specifically, $BaCl_2$; and an ammonium salt, specifically $NH_4Cl$. These aqueous electrolytic solutions were adjusted to pH 4.0 and to a concentration of 0.1 N with hydrochloric acid, in accordance with the results of Example 3. It has been found that $K^+$, $Rb^+$, $Cs^+$ and $NH_4^+$ ions provide for stable coloring/bleaching of the coating film as shown by the data in FIG. 7.

In conjunction with the above results, the radius of a crystallized ion and the Stokes' ionic radius (which is one of measures of the radius of a hydrated ion) are shown for various ions in Table 2. As seen from this data, the Stokes' ionic radius of those cations capable of stable driving is in good agreement with the bottle-neck radius of 1.75 Å of the iron(III) hexacyanoferrate(II) salt.

TABLE 2

| | Various ions and their ionic radii | |
|---|---|---|
| Ion | Radius of crystallized ion (Å) | Stokes' ionic radius (Å) |
| $H^+$ | 1.14 | — |
| $Li^+$ | 0.60 | 2.37 |
| $Na^+$ | 0.95 | 1.87 |
| $K^+$ | 1.33 | 1.25 |
| $Rb^+$ | 1.48 | 1.18 |
| $Cs^+$ | 1.69 | 1.19 |
| $NH_4^+$ | 1.48 | 1.25 |
| $Ba^{++}$ | 1.35 | 2.88 |

EXAMPLE 5

This example was carried out to prove that the wave having a peak at about 0.9 V vs. S.C.E. in the cyclic voltammogram does not correspond to the electrochemical reaction based on the movement of cations into and out of the iron(III) hexacyanoferrate (II) salt coating film. A comparison of the quantity of charge in the electrode reaction associated with the wave having a peak at about 0.2 V vs. S.C.E. with the quantity of charge in the electrode reaction at about 0.9 V vs. S.C.E. will prove that the electrochemical reaction at 0.9 V vs. S.C.E. is based on the movement of anions into and out of the insoluble Prussian blue layer.

Figure 8:
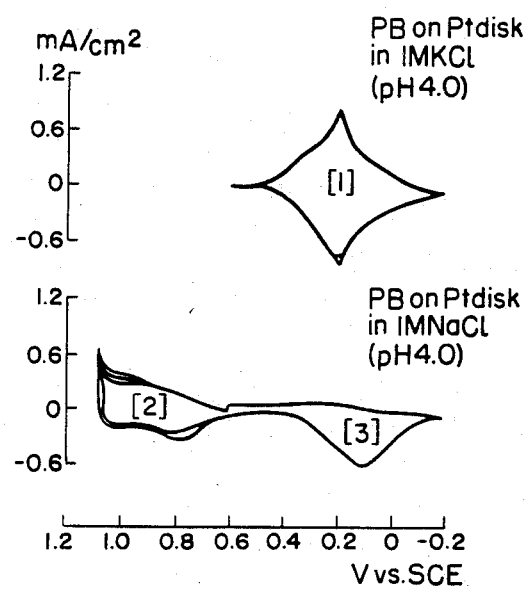
FIG. 8 is a cyclic voltammogram of the iron(III) hexacyanoferrate(II) salt-coated electrode of the present invention, in which (1) corresponds to the electrode in 1M KCl and (2) and (3) correspond to the electrode in 1M NaCl.

FIG. 8 shows a cyclic voltammogram of an iron(III) hexacyanoferrate(II) salt-coated electrode. Curve (1) in FIG. 8 is a stable cyclic voltammogram of the electrode at about 0.2 V vs. S.C.E. in 1 M KCl aqueous solution, and this is an electrode reaction based on the movement of K+ ions as described in Example 4. Curves (2) and (3) in FIG. 8 show cyclic voltammograms of the electrode in 1 M NaCl. Curve (2) shows that the electrode reaction at about 0.9 V vs. S.C.E. is stable and reversible, and curve (3) shows that the electrode reaction at about 0.2 V vs. S.C.E. gives rise to irreversible failure of the coating film after one cycle of potential scanning. The reaction of curve (3) is based on the movement of cations into and out of the electrode coating film as described above and in this case, it results in failure of the electrode coating film because the Stokes' radius of an Na+ ion is larger than the bottle-neck diameter of a Prussian blue crystal lattice. The reaction of curve (2) is reversible unlike the reaction of curve (3), which indicates that this electrode reaction is not based on the movement of Na+ ion into and out of the electrode coating. Accordingly, the electrochemical reaction represented by the cyclic voltammogram having a peak at about 0.9 V vs. S.C.E. is not based on the movement of cations into and out of the Prussian blue coating, but probably on the movement of anions.

Figure 9:
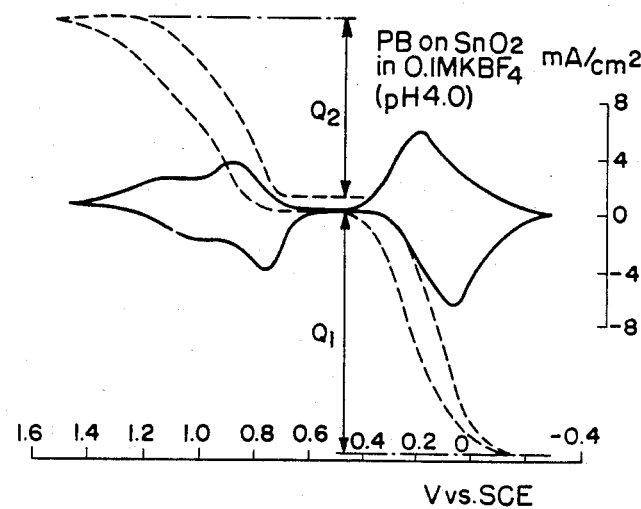
FIG. 9 is a cyclic voltammogram of the iron(III) hexacyanoferrate(II) salt-coated electrode of the present invention in 0.1N KBF$_4$, in which Q$_1$ designates the quantity of charge required for oxidation-reduction along the wave having a peak at about 0.2 V vs. S.C.E. and Q$_2$ designates the quantity of charge required for oxidation-reduction along the wave having a peak at about 0.9 V vs. S.C.E.

Further, in FIG. 9, a solid curve shows a cyclic voltammogram of the iron(III) hexacyanoferrate(II) salt coating on a tin oxide transparent electrode which is placed in an aqueous electrolyte solution of 0.1N KBF$_4$, and the dashed lines show how the quantity of charge representative of the extent of electrode reaction varies. The quantity of charge is measured as an integral of the electrode current. In FIG. 9, $Q_1$ is the quantity of charge representative of the extent of an electrode reaction having a peak at about 0.2 V vs. S.C.E., that is, the reacting weight according to equation (6) or (6'). $Q_2$ is the quantity of charge representative of the extent of an electrode reaction having a peak at about 0.9 V vs. S.C.E., that is, the reacting weight according to equation (7) or (7'), provided that this electrode reaction is based on the movement of anions into and out of the electrode coating as concluded from the data shown in FIG. 8.

TABLE 3

| | Comparison between $Q_1$ and $Q_2$ | |
|---|---|---|
| | Calculated for | Calculated for |
| Found | Fe$_4$[Fe(CN)$_6$] | KFe[Fe(CN)$_6$] |
| $Q_2/Q_1$ .744 | ¾ = 0.75 | 1/1 = 1.0 |

The ratio of $Q_2$ to $Q_1$ measured in FIG. 9, the ratio of reacting weights calculated from reaction formulas (6') and (7') when the electrode coating film is insoluble Prussian blue [Fe$^{III}_4$[Fe$^{II}$(CN)$_6$]$_3$], and the ratio of reacting weights calculated from reaction formulas (6) and (7) when the electrode coating film is soluble Prussian blue (KFe$^{III}$[Fe$^{II}$(CN)$_6$]) are summarized in Table 3. As seen from this data, there is support for the conclusion that the electrode reaction exhibiting a peak at about 0.9 V vs. S.C.E. on the cyclic voltammogram is a reaction associated with anions if the electrode coating film is a film of insoluble Prussian blue.

EXAMPLE 6

This example was carried out to select an optimum anion for an electrolyte when the results of Example 5 are taken into account.

An iron(III) hexacyanoferrate(II) salt-coated electrode was prepared as described in Example 1, and the evaluation of anions was made on the basis of retention of the reactive film as in Example 3. However, the reactive film retention based on the quantity of electricity does not ensure a precise comparison because the residual current has a considerable influence at potentials in excess of 1.0 V vs. S.C.E. in the case of a particular electrolyte. Thus, retention of the reactive film as defined below was used as an index for evaluating the electrolyte anions. That is, the ratio of peak currents at about 0.9 V vs. S.C.E. was used in this example.

$$\text{Retention of the reactive film (2)} = \frac{\text{Peak current after a given number of cycles}}{\text{Peak current in the first cycle}} \times 100\%$$

The potential stepping waveform used for evaluation was a driving waveform between 0.6 V and 1.4 V vs. S.C.E. having a frequency of 1 Hz. The electrolytes used were KCl, KF, KPF$_6$, KNO$_3$, KClO$_4$, CH$_3$COOK, K$_2$SO$_4$ and KBF$_4$.

Figure 10:
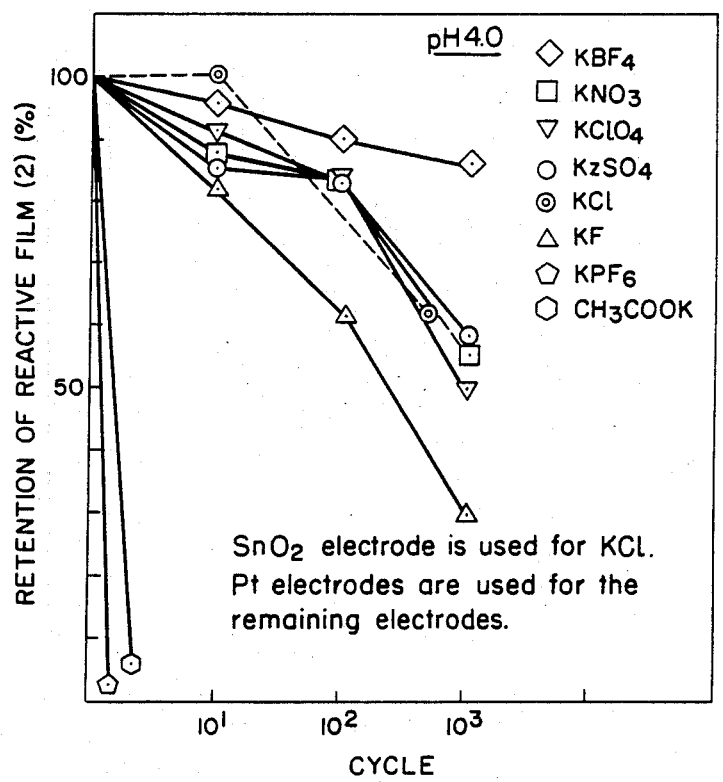
FIG. 10 shows the variation of the reactive film retention with increasing cycles for various anions.

FIG. 10 shows the retentions of reactive films obtained for various anions on the wave having a peak at 0.9 V vs. S.C.E. in the cyclic voltammograms of the electrodes through 10$^3$ cycles.

Table 4 shows the Stokes' ionic radii of various ions. In Table 4, the symbol 'O' denotes acceptable film stability and the symbol 'X' denotes unacceptable film stability.

TABLE 4

| Various anions and their Stokes' ionic radii | | |
|---|---|---|
| Ion | Stokes' ionic radius (A) | Film Stability |
| F$^-$ | 1.67 | O |
| Cl$^-$ | 1.20 | O |
| NO$_3^-$ | 1.29 | O |
| ClO$_4^-$ | 1.36 | O |
| BF$_4^-$ | — | O |
| PF$_6^-$ | — | X |
| CH$_3$COO$^-$ | 2.24 | X |
| SO$_4^=$ | 1.15 | O |

As seen from FIG. 10 and Table 4, the anions which allow the iron(III) hexacyanoferrate(II) salt-coated electrode of the present invention to be operated in a stable manner are properly selected on the basis of Stokes' radius of the anion and the bottleneck diameter of the crystal lattice of the iron(III) hexacyanoferrate(II) salt, as in the case of cations.

EXAMPLE 7

This example aimed at providing further information regarding the precise principle of coloring/bleaching the iron(III) hexacyanoferrate(II) salt-coated electrode according to the present invention on the basis of a new discovery obtained by repeating coloring/bleaching of the electrode between blue and colorless states and thereafter analyzing the composition of the electrode coating film.

The general procedure of Example 2 was repeated. The composition of the coating film on the electrode was analyzed both immediately after the preparation and after coloring/bleaching of the coated electrode was carried out, for several cycles in an aqueous solution of 1 M KCl.

TABLE 5

| Composition distribution unit: μg/mC | |
|---|---|
| As prepared | After several cycles |
| Fe 1.02 | 1.02 |

| TABLE 5-continued | | |
|---|---|---|
| | Composition distribution unit: μg/mC | |
| | As prepared | After several cycles |
| K | 0.06 | 0.30 |

As seen from Table 5, a comparison between the analytical values of blue colored coating films after several cycles of coloring/bleaching and the initially prepared film reveals that the potassium content of the coating film increases after several cycles. This means that potassium ions and electrons are simultaneously introduced into the coating film during bleaching, and further driving of the coating film in a coloring direction is accompanied with not only the movement of potassium ions and electrons out of the coating film, but also the movement of chloride ions (anions) into and electrons out of the coating film as shown by the following equations:

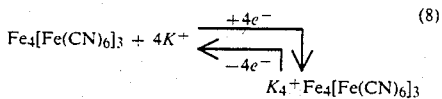

(8)

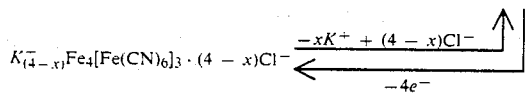

This will be more generally expressed by electrochemical equation (9):

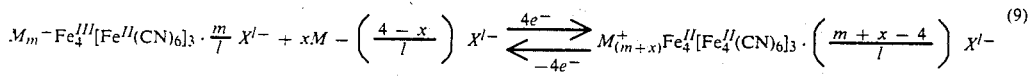

(9)

In the formulas of equation (9), $M^+$, $X^{l-}$, m, and x are defined as follows.

$M^+$: a monovalent cation, $K^+$, $Rb^+$, $Cs^+$, $NH_4^+$, etc.

$X^{l-}$: an l-valent anion, $BF_4^-$, $SO_4^=$, $ClO_4^-$, etc.

l: 1 or 2 m: 0, 1, 2, 3, 4 or 5 x: the number of cations moving into and out of the coating film.

Furthermore, the presence of either sub-lattices in a Prussian blue lattice and other factors impose the following restriction to m, l, and x. That is, m, l, and x should simultaneously satisfy the relationships:

$$0 \leq \frac{(l+1)m}{l} \leq 8 \quad (1)$$

$$0 \leq \frac{(l+1)(m+x) - 4}{l} \leq 8 \quad (2)$$

$$0 \leq \frac{(m+x-4)}{l} \quad (3)$$

$$0 \leq \frac{(l+1)(m+ly) - 3l}{l} \leq 8 \quad (4)$$

$$0 \leq m + ly - 3 \quad (5)$$

EXAMPLE 8

This example provides a novel principle of coloring/bleaching the iron (III) hexacyanoferrate(II) salt-coated electrode between blue and brown colored states as a result of determinations described in Example 7, on the wave having a peak at about 0.9 V vs. S.C.E. in the cyclic voltammogram of the electrode.

The oxidation-reduction mechanism of the wave having a peak at about 0.9 V may be represented by general equation (10):

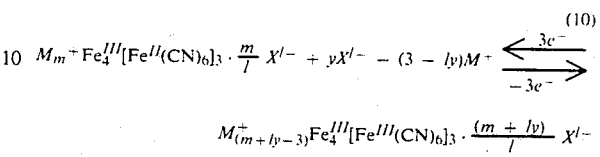

(10)

In the formulas of equation (10), $M^+$, $X^{l-}$, m, and y have the following meanings.

$M^+$: a monovalent cation, such as $K^+$, $Rb^+$, $Cs^+$, $NH_4^+$, etc.

$X^{l-}$: an l-valent anion, such as $BF_4^-$, $SO_4^=$, $ClO_4^-$, etc.

m: 0, 1, 2, 3, 4 or 5.

l: 1 or 2.

y: the number of anions moving into and out of the coating film.

EXAMPLE 9

A display device as shown in FIG. 11 was used in this example. FIG. 11-(a) and FIG. 11-(b) are plan and cross-sectional views of the display device, respectively. A patterned tin oxide transparent conductive film electrode 18 was formed on a glass substrate 17, and a layer 19 of iron(III) hexacyanoferrate(II) was electro-deposited on a display portion of the transparent conductive film by a method similar to that described in Example (1) to form a display electrode.

During this electrodeposition, the remaining portion of the transparent conductive film 18 other than the display portion was previously masked through the application of an adhesive cellophane tape to prevent the electrochromic material from depositing thereon. A conductive film electrode 21 of platinum was sputtered on the surface of a lower glass substrate 20. The sputtered platinum film 21 was coated on the surface with a layer 22 of iron(III) hexacyanoferrate(II) salt in the same manner as in the case of the display portion to form a counter electrode. An electrolyte solution 23 comprising a solution of 1 molar potassium chloride in 0.001N hydrochloric acid was placed between the coated platinum film 21 and the coated glass substrate 17. A porous Teflon sheet 24 was immersed in the electrolyte solution as a background plate to constitute a white background for the display. The cell was sealed along its periphery with a layer 25 of epoxy resin. A voltage source 16 was connected to the two electrodes through a double-throw switch 15 to operate the display device at a voltage of 0.8 V.

When the contacts of the switch 15 were positioned at connection A, a negative voltage of −0.8 V was applied to the display electrode with respect to the counter electrode, and the iron(III) hexacyanoferrate(II) salt layer 19 was changed into a colorless state so that the display disappeared. When the switch 15 was changed-over to connection C, the display electrode was at a potential of 0 V with respect to the counter electrode, and the iron(III) hexacyanoferrate(II) salt layer 19 turned blue to establish the display. Furthermore, when the switch 15 was changed-over to connection B, the electric circuit was opened and no voltage was applied to the display electrode. The color of the iron(III) hexacyanoferrate(II) salt layer 19 remained unchanged so that either a colored state or a bleached state was maintained depending on the state of the layer immediately before switching. Consequently, the display state was memorized.

EXAMPLE 10

A display device as shown in FIG. 12 was used in this example. FIGS. 12-(a) and 12-(b) are plan and cross-sectional views of the display device which is shown as constituting an eight-segment numerical display device. A tin oxide transparent conductive film electrode 18 on an upper glass substrate 17 was provided with a pattern of predetermined configuration by photolithography to form a pattern of display electrodes. A lead portion of the transparent conductive film other than the display portion was masked by vapor depositing an insulating layer 26 of silicon dioxide before a layer 19 of potassium iron(III) hexacyanoferrate(II) was electrodeposited on the display portion. On a lower glass substrate 20, an electrode was formed as the counter electrode by coating a sputtered platinum layer 21 with a layer 22 of potassium iron(III) hexacyanoferrate partially containing reduced $K_2Fe^{II}[Fe^{II}(CN)_6]$. A cell was filled with a solution of 1 molar potassium chloride in 0.1N hydrochloric acid as an electrolytic solution 23, equipped with white background plate 24 of porous Teflon, and sealed along its periphery with a layer 25 of epoxy resin. For electrical connection to the sputtered platinum layer 21, i.e., the counter electrode, a conductive layer 27 of silver-dispersed conductive resin was formed in the epoxy resin layer 25 at a corner of the cell to electrically connect the tin oxide conductive film on the upper glass substrate to the patterned lead portion of the counter electrode.

Though not shown in FIG. 12, the display device was connected to a drive unit including a power supply, switching means for electronically switching polarity, and a logic circuit coupled with the switching means for selecting the polarity of the eight display electrodes from among the positive, negative and open-circuit states in accordance with a numeral to be displayed. The device was operated by applying a voltage of 1 V. It was found that any desired numeral could be displayed in an asethetic blue color by controlling the switching of the electrical connections.

EXAMPLE 11

It is to be noted that the electrode arrangement is not limited to the embodiments shown in FIG. 11 and FIG. 12. Other embodiments are illustrated in FIG. 13 and FIG. 14. In these other embodiments, the counter electrode has been removed. In the embodiment shown in FIG. 13, a plurality of display electrodes 19 are formed on a first substrate 17. The electric charge which causes the electrochemical oxidation and reduction reaction of the iron(III) hexacyanoferrate(II) transfers between the display electrodes (as shown by the double-headed arrow) so as to provide for display.

In the embodiment shown in FIG. 14, a plurality of display substrate 19 are formed on both the first electrode 17 and the second substrate 20. Then the charge which causes color change of the iron(III) hexacyanoferrate(II) transfers between the display electrodes on the first substrate and the display electrodes on the second electrode (as shown by the double-headed arrow) so as to provide for display.

What we claim is:

1. In an electrochromic display device: a pair of spaced-apart substrates; an electrolyte contained between the spaced-apart substrates; a set of electrodes disposed on at least one of the substrates in contact with the electrolyte; a layer of electrochromic material disposed on at least one of the electrodes to define a display electrode, the layer of electrochromic material comprising a color-reversible salt of iron(III) hexacyanoferrate(II) electrodeposited on the surface of the display electrode as an intimately adhering blue insoluble solid film; and means for effecting reversible electrochemical oxidation and reduction of the salt of iron(III) hexacyanoferrate(II) to effect a corresponding reversible color change exhibited by the display electrode.

2. The electrochromic display device as set forth in claim 1; wherein the layer of electrochromic material comprises a layer of iron(III) hexacyanoferrate(II) salt electrodeposited on the surface of the display electrode as an intimately adhering blue insoluble solid film from a solution having iron(III) ions and hexacyanoferrate(III) ions dissolved therein.

3. The electrochromic display device as set forth in claim 1; wherein said layer of electrochromic material exhibits a first color state in the ground state, a second color state different than the first color state in the reduced state and a third color state different from the first and second color states in the oxidized state.

4. The electrochromic display device as set forth in claim 1; wherein the layer of the electrochromic material disposed on the display electrode is a layer of a complex salt composition containing iron(III) hexacyanoferrate(II) which in a ground state exhibits a first color state and has a composition corresponding to the formula

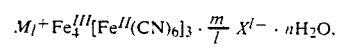

in a reduced state exhibits a second color state and has a composition corresponding to the formula

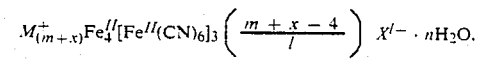

and in an oxidized state exhibits a third color state and has a composition corresponding to the formula

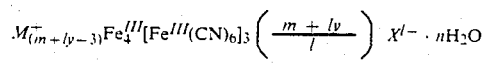

wherein
$M^+$ is a monovalent cation,
$X^{l-}$ is an l-valent anion,
l is 1 or 2,
m is 0 or a positive integer of not more than 5,
n is 0 or a positive integer of not more than 14,
x and y are positive integers.

and wherein l, m, x and y satisfy all the following relationships, $$0 \leq (l-1)m \leq 8$$

$$0 \leq (l-1)(m+x)-4 \leq 8l$$

$$0 \leq m-x-4$$

$$0 \leq (l-1)(m+ly)-3l \leq 8l$$

$$0 \leq m+ly-3.$$

5. The electrochromic display device as set forth in claim 1; wherein said layer of the electrochromic material is an insoluble coating layer which
in the ground state is insoluble Prussian blue represented by the formula $$Fe^{III}{}_4[Fe^{II}(CN)_6]_3,$$

in the reduced state is represented by the formula $$M^+{}_4Fe^{II}[Fe^{II}(CN)_6]_3,$$

and in the oxidized state is represented by the formula $$Fe_4^{III}[Fe^{III}(CN)_6]_3 \cdot \frac{3}{l} X^{l-}$$

wherein
M+ is a monovalent cation
X$^{l-}$ is an anion of valence $l-$
l is 1 or 2.

6. The electrochromic display device as set forth in claim 4 or 5; wherein the monovalent cation M+ is a potassium ion, rubidium ion, cesium ion or ammonium ion; and the electrolyte comprises an electrolyte containing the same cation.

7. The electrochromic display device as set forth in claim 4 or 5; wherein the anion X$^{l-}$ is a fluoride ion, chloride ion, nitrate ion, perchlorate ion, tetrafluoroborate ion or hexafluorophosphate ion when l is equal to 1, or a sulfate ion or carbonate ion when l is equal to 2; and the electrolyte comprises an electrolyte containing the same anion.

8. The electrochromic display device as set forth in any one of claims 1-5 wherein the electrolyte comprises an electrolyte solution having a pH value in the range of between about 3 and 5.

9. The electrochromic display device as set forth in claim 1; wherein the set of electrodes other than the display electrodes includes a counter electrode disposed on the substrate opposite to the substrate having disposed thereon the display electrodes; and a layer of a salt of iron(III) hexacyanoferrate(II) disposed on the counter electrode.

10. The electrochromic display device as set forth in claim 9; wherein the counter electrode comprises an electrode coated with a layer of a salt of iron(III) hexacyanoferrate(II) which is electrodeposited as an insoluble solid film from a solution containing iron(III) ions and hexacyanoferrate(III) ions.

11. A method of producing a display element for use in an electrochromic display device comprising: providing an aqueous solution containing iron(III) ions and hexacyanoferrate(III) ions; and electrodepositing iron(III) hexacyanoferrate(II) salt on an electrode from the aqueous solution containing iron(III) ions and hexacyanoferrate(III) ions.

12. The method of claim 11; wherein the aqueous solution contains about equal molar amounts of iron(III) ions and hexacyanoferrate(III) ions.

13. The method of claim 11; wherein the aqueous solution comprises an aqueous acidic solution.

14. The method of claim 11; wherein the aqueous solution contains about equal molar amounts of iron(III) chloride and potassium hexacyanoferrate(III).

15. In an electrochromic display device: a display element comprising an electrode, and an electrochromic material comprised of a layer of iron(III) hexacyanoferrate(II) salt electrodeposited on the surface of said electrode as an intimately adhering blue insoluble solid film.

16. The electrochromic display device according to claim 15; wherein the layer of electrochromic material comprises a layer of iron(III) hexacyanoferrate(II) salt electrodeposited on the surface of the electrode as an intimately adhering blue insoluble solid film from a solution having iron(III) ions and hexacyanoferrate(III) ions dissolved therein.

17. The electrochromic display device according to claim 15; wherein said layer of electrochromic material is an insoluble coating layer which
in the ground state is insoluble Prussian blue represented by the formula $$Fe^{III}{}_4[Fe^{II}(CN)_6]_3,$$

in the reduced state is represented by the formula $$M^+{}_4Fe^{II}[Fe^{II}(CN)_6]_3,$$

and in the oxidized state is represented by the formula $$Fe_4^{III}[Fe^{III}(CN)_6]_3 \cdot \frac{3}{l} X^{l-}$$

wherein
M+ is a monovalent cation
X$^{l-}$ is an anion of valence $l-$
l is 1 or 2.

18. A display electrode for use in an electrochromic display device comprising: an electrode; and an electrochromic material comprised of a layer of iron(III) hexacyanoferrate(II) salt electrodeposited on the surface of said electrode as an intimately adhering blue solid film in an amount effective to exhibit electrochromic activity.

19. The display electrode according to claim 18, wherein the layer of electrochromic material comprises a layer of iron(III) hexacyanoferrate(II) salt electrodeposited on the surface of the electrode as an intimately adhering blue insoluble solid film.

20. The display electrode according to claim 18; wherein the layer of electrochromic material comprises a layer of iron(III) hexacyanoferrate(II) salt electrodeposited on the surface of the electrode as an intimately adhering blue insoluble solid film from a solution having iron(III) ions and hexacyanoferrate(III) ions dissolved therein.

21. The display electrode according to claim 18; wherein said electrochromic material
in a ground state exhibits a first color state and has a composition corresponding to the formula $$M_l^+Fe_4^{III}[Fe^{II}(CN)_6]_3 \cdot \frac{m}{l} X^{l-} \cdot nH_2O.$$

in a reduced state exhibits a second color state and has a composition corresponding to the formula $$M_{(m+x)}^+ Fe_4^{II}[Fe^{II}(CN)_6]_3 \left(\frac{m+x-4}{l}\right) X^{l-} \cdot nH_2O,$$

and in an oxidized state exhibits a third color state and has a composition corresponding to the formula $$M_{(m+ly-3)}^+ Fe_4^{III}[Fe^{III}(CN)_6]_3 \left(\frac{m+ly}{l}\right) X^{l-} \cdot nH_2O$$

wherein
$M^+$ is a monovalent cation,
$X^{l-}$ is an l-valent anion,
l is 1 or 2,
m is 0 or a positive integer of not more than 5,
n is 0 or a positive integer of not more than 14,
x and y are positive integers,
and wherein l, m, x and y satisfy all the following relationships, $$0 \leq (l+1)m \leq 8$$

$$0 \leq (l+1)(m+x) - 4 \leq 8l$$

$$0 \leq m+x-4$$

$$0 \leq (l+1)(m+ly) - 3l \leq 8l$$

$$0 \leq m+ly-3.$$

22. The display electrode according to claim 18; wherein said layer of the electrochromic material is an insoluble coating layer which
in the ground state is insoluble Prussian blue represented by the formula $$Fe^{III}_4[Fe^{II}(CN)_6]_3,$$

in the reduced state is represented by the formula $$M^+{}_4Fe^{II}[Fe^{II}(CN)_6]_3,$$

and in the oxidized state is represented by the formula $$Fe_4^{III}[Fe^{III}(CN)_6]_3 \cdot \frac{3}{l} X^{l-}$$

wherein
$M^+$ is a monovalent cation
$X^{l-}$ is an anion of valence $1^-$
l is 1 or 2.

23. The display electrode according to claim 21 or 22; wherein the monovalent cation $M^+$ is a potassium ion, rubidium ion, cesium ion or ammonium ion; and the electrolyte comprises an electrolyte containing the same cation.

24. The display electrode according to claim 21 or 22; wherein the anion $X^{l-}$ is a fluoride ion, chloride ion, nitrate ion, perchlorate ion, tetrafluoroborate ion or hexafluorophosphorate ion when l is equal to 1, or a sulfate ion or carbonate ion when l is equal to 2; and the electrolyte comprises an electrolyte containing the same anion.

25. A process for synthesizing iron(III) hexacyanoferrate (II) comprising the steps of immersing a pair of electrodes in a solution mixture of an iron(III) ion-containing solution and a hexacyanoferrate(III) ion-containing solution, and effecting electrolysis with one of said pair of electrodes being an anode and the other being a cathode, thereby depositing iron(III) hexacyanoferrate(II) as a blue electrolytic product on the surface of the cathode.

26. A film of iron(III) hexacyanoferrate(II) synthesized by process of immersing a pair of electrodes in a solution mixture of an iron(III) ion-containing solution and a hexacyanoferrate(III) ion-containing solution, and effecting electrolysis with one of said pair of electrodes being an anode and the other being a cathode, thereby depositing iron(III) hexcyanoferrate (II) as a blue electrolytic product on the surface of the cathode.

27. An electrodeposited film or iron(III) hexacyanoferrate (II) on an electrode.

28. An electrodeposited film of iron(III) hexacyanoferrate (II) according to claim 27, wherein said electrode is effective as the cathode in the electrolysis of a solution containing iron(III) ions and hexacyanoferrate(III) ions.

* * * * *